(12) United States Patent
Couillet

(10) Patent No.: US 8,842,754 B2
(45) Date of Patent: Sep. 23, 2014

(54) PROCESS FOR ESTIMATING THE CHANNEL IN A OFDM COMMUNICATION SYSTEM, AND RECEIVER FOR DOING THE SAME

(75) Inventor: Romain Couillet, Antony (FR)

(73) Assignees: ST-Ericsson SA, Plan-les-Ouates (CH); ST-Ericsson (France) SAS, Grenoble (FR)

( * ) Notice: Subject to any disclaimer, the term of this patent is extended or adjusted under 35 U.S.C. 154(b) by 18 days.

(21) Appl. No.: 13/395,975

(22) PCT Filed: Sep. 16, 2010

(86) PCT No.: PCT/EP2010/005694
§ 371 (c)(1),
(2), (4) Date: May 9, 2012

(87) PCT Pub. No.: WO2011/032700
PCT Pub. Date: Mar. 24, 2011

(65) Prior Publication Data
US 2012/0213315 A1    Aug. 23, 2012

(30) Foreign Application Priority Data

Sep. 17, 2009 (EP) .................................... 09368030

(51) Int. Cl.
*H04K 1/10* (2006.01)
*H04L 27/28* (2006.01)
*H04L 25/02* (2006.01)

(52) U.S. Cl.
CPC .......... *H04L 25/022* (2013.01); *H04L 25/0224* (2013.01); *H04L 25/0244* (2013.01)
USPC ............ 375/260; 375/267; 370/203; 370/208

(58) Field of Classification Search
USPC ........... 375/260, 267, 299, 343; 370/203–211
See application file for complete search history.

(56) References Cited

U.S. PATENT DOCUMENTS

2008/0155371 A1* 6/2008 Mauritz et al. ................ 714/748

OTHER PUBLICATIONS

International Search Report issued in corresponding International Application No. PCT/EP2010/005694, mailed Nov. 19, 2011.
Written Opinion of the International Searching Authority issued in corresponding International Application No. PCT/EP2010/005694, mailed Nov. 19, 2011.

(Continued)

*Primary Examiner* — Curtis Odom
(74) *Attorney, Agent, or Firm* — Patent Portfolio Builders PLLC

(57) ABSTRACT

A process for estimating a channel in an OFDM communication system, wherein an OFDM sample is based on a time-frequency grid comprising a set of pilots may include the steps of receiving, by a receiver, OFDM sample based subframes comprising a set of pilot signals, performing an iterative loop for the purpose of computing $(M_k, k_k)$ respectively corresponding to the covariance matrix and the mean of the probability distribution of $p(h_k|y_k, l_k)$ at time instant k, $y_k$, and $l_k$ respectively corresponding to the received signal and to a priori known information, the value of $(M_k, k_k)$ being computed as a function of $(M_{k-1}, k_{k-1})$ as well as the values of the pilots received at instant k.

15 Claims, 5 Drawing Sheets

(56) References Cited

OTHER PUBLICATIONS

Couillet, Romain: "A Maximum Entropy Approach to OFDM Channel Estimation", retrieved from Internet, URL: http://arxiv4.library.cornell.edu/PS_cache/arxiv/pdf/0811/0811.0778v1.pdf, Nov. 5, 2008, XP002573433, entire document.

Shannon, C.E.: "A Mathematical Theory of Communications", Bell System Technical Journal, vol. 27, No. 7, pp. 379-423, 1948.

Jaynes, E.T.: "Information Theory and Statistical Mechanics", Physical Review, APS, vol. 106, No. 4, pp. 620-630, Mar. 4, 1957.

Caticha, Ariel: "Lectures on Probability, Entropy and Statistical Physics", arXiv:0808.0012v1 [physics.data-an], retrieved from Internet, URL: http://arxiv.org/pdf/0808.0012, Jul. 31, 2008, entire document.

International Preliminary Report of Patentabiity in corresponding International Application No. PCT/EP2010/005694 mailed on Mar. 29, 2012.

\* cited by examiner

US 8,842,754 B2

PROCESS FOR ESTIMATING THE CHANNEL IN A OFDM COMMUNICATION SYSTEM, AND RECEIVER FOR DOING THE SAME

TECHNICAL FIELD

The invention relates to telecommunications and more particularly to a method for estimating the transmission channel vector in an Orthogonal Frequency Division Multiplexing (OFDM) communication system, and receiver for doing the same.

BACKGROUND ART

Orthogonal Frequency Division Multiplexing (OFDM) communication systems is a widely developed technique in the field of wireless digital communications thanks to the high possibilities offered by digital signal processing and Discrete Fourier Transform computations.

However, the efficiency of the process strongly depends on the estimation of the channel, which is achieved thanks to the communication of pilot signals within the subframe.

FIG. 1 illustrates the particular structure of the time-frequency OFDM grid, corresponding to a sub-frame, with the location of the pilots.

Many mechanisms are known in the art for computing an estimation of the channel vector $h_k$ (k corresponding to the discrete instant k), including iterative algorithms deriving the particular knowledge of $h_k$ from the knowledge of $h_{k-1}$ and the new information brought be the pilots received at the instant k.

Generally speaking, the channel estimation is much more effective when one knows the law of variation of the channel—its time correlation—and when one may store the high volume of data derived from the received pilots so as to elaborate the most comprehensive knowledge of the channel estimation.

However, it is clear that the storage of a high volume of data increases the amount of storage required for the estimation process and moreover the amount of digital processing resources for processing such information.

For those reasons, many channel estimation processes are based on an iterative mechanism for computing the estimate $\hat{h}_k$ of the vector channel only based on the preceding estimate $\hat{h}_{k-1}$ and the newly received information. Such iterative mechanisms show clear limitations particularly when the channel shows a large delay spread prohibiting accurate interpolation between the OFDM subcarriers.

In such an environment, but not exclusively, there is a need for an effective iterative mechanism, which takes advantage of all the information being available at a given instant k−1 for computing the estimated channel $\hat{h}_k$ at the instant k.

Such is the technical problem to be solved by the present invention

SUMMARY OF THE INVENTION

It is an object of the present invention to provide a process estimating a channel for an OFDM communication system which can be used in particular in a mobile handset.

It is a further object of the present invention to provide a process of channel estimation for an OFDM communication system which reduces the amount of data to be stored for computing an accurate estimate of the channel.

It is another object of the present invention to provide a channel estimation method, using the Maximum Entropy principle, which allows one to assign probability distributions for the channel, when the estimator only knows the last past inferred channel distribution and the new received pilot symbols.

Those and other objects are achieved by means of a process for estimating the channel in an OFDM communication system, with OFDM samples formed of a time-frequency grid comprising a set of pilots.

The process involves the steps of:

receiving OFDM subframes comprising a set of pilot signals;

performing an iterative loop for the purpose of computing $(M_k, k_k)$ respectively corresponding to the covariance matrix and the mean of the probability distribution of $p(h_k|y_k, I_k)$ at time instant k, $y_k$, and $I_k$ respectively corresponding to the received signal vector and to a priori known information;

said value of $(M_k, k_k)$ being computed as a function of $(M_{k-1}, k_{k-1})$, $\lambda$ being the time correlation (left to be defined) between the true channels $h_k$ and $h_{k-1}$ as well as the values of the pilots received at instant k.

More particularly, the process performs an estimation of the channel based on the mean $k_k$ and variance $M_k$ of the distribution of the channel estimation in accordance with the following formulation:

$$\begin{cases} M_k = \lambda^2\left(M_{k-1} + \frac{1-\lambda^2}{\lambda^2}Q\right) \times \left(\frac{\lambda^2}{\sigma^2}P_k\left(M_{k-1} + \frac{1-\lambda^2}{\lambda^2}Q\right) + I_N\right)^{-1} \\ k_k = \lambda k_{k-1} + \frac{1}{\sigma^2}M_k P_k(h'_k - \lambda k_{k-1}) \end{cases}$$

With

N being the number of subcarriers in the OFDM symbol;

$k_k$ being the estimated channel at instant k;

$M_k$ being an N×N matrix representative of the variance of the estimated channel at instant k;

Q being a matrix initialized to a predetermined value;

$P_k$ is an N×N diagonal matrix comprising a "1" at the location corresponding to a subcarrier at pilot position and a "0" elsewhere;

$I_N$ being the N×N identity matrix;

$\sigma^2$ being the variance of the noise process;

$h'_k$ being equal to the received signal $y_k$ divided pointwise by the corresponding signal vector $s_k$;

$\lambda$ corresponding to the channel time correlation between instant k−1 and k.

In one embodiment, the matrix Q is an a priori frequency covariance matrix for an L-tap uniform channel, i.e. $Q = F_L F_L^H$, with $F_L$ the matrix formed by the L first columns of the N×N DFT matrix Preferably, the time correlation factor ($\lambda$) corresponds to the correlation factor in the auto regressive model of the first order for the time series $h_k$.

In one embodiment, the parameter $M_k$ is forwarded to the base station as an information representative of the quality of the channel estimation.

Preferably, the process is used for the Long Term Evolution (LTE) standard.

A process is also provided, which can be used even without the knowledge of the time correlation variable $\lambda$.

In that case the process involves the following steps:

performing an iterative loop for the purpose of computing $(M_k^{(\lambda)}, k_k^{(\lambda)})$ respectively corresponding to the variance and the mean of the probability distribution of $p(h_k|y_k, I_k)$ at time instant k, $y_k$, and $I_k$ respectively corresponding to the received signal and to a priori known information;

said value of $(M_k^{(\lambda)}, k_k^{(\lambda)})$ being computed as a function of $(M_{k-1}^{(\lambda)}, k_{k-1}^{(\lambda)})$ for a predetermined set of values of time correlation $\lambda \in \{\lambda_n\}$ with n=1 to M, for some positive integer M, between the true channel $h_k$ and $h_{k-1}$, as well as the values of the pilots received at instant k, $$\hat{h}_k = \frac{\sum_{n=1}^{N} e^{-x(\lambda_n)} \det[X(\lambda_n)] k_k^{(\lambda_n)}}{\frac{1}{N}\sum_{n=1}^{N} e^{-x(\lambda_n)} \det[X(\lambda_n)]}$$

With $$\begin{cases} M_k^{(\lambda)} = \lambda^2 \left(M_{k-1}^{(\lambda)} + \frac{1-\lambda^2}{\lambda^2}Q\right) \times \left(\frac{\lambda^2}{\sigma^2}P_k\left(M_{k-1}^{(\lambda)} + \frac{1-\lambda^2}{\lambda^2}Q\right) + I_N\right)^{-1} \\ k_k^{(\lambda)} = \lambda k_{k-1}^{(\lambda)} + \frac{1}{\sigma^2}M_k^{(\lambda)}P_k(h_k' - \lambda k_{k-1}^{(\lambda)}) \end{cases}$$

And $$\begin{cases} X(\lambda) = \left(I + \frac{P_k}{\sigma^2}(\lambda^2 M_{k-1}^{(\lambda)} + (1-\lambda^2)Q)\right)^{-1} \\ X(\lambda) = (\lambda k_{k-1}^{(\lambda)} - h_k')^H X(\lambda) \frac{P_k}{\sigma^2}(\lambda k_{k-1}^{(\lambda)} - h_k') \end{cases}$$

With $k_k^{(\lambda)}$ being the estimated channel at instant k depending on $\lambda$, $M_k^{(\lambda)}$ being a matrix representative of the variance of the estimated channel at instant k; depending on $\lambda$, Q being a matrix initialized to a predetermined value;

$P_k$ is a diagonal N×N matrix comprising a "1" at the location of a pilot symbol;

$I_N$ being the N×N identity matrix;

$\sigma^2$ being the variance of the noise;

$h'_k$ being equal to the received signal $y_k$ pointwise divided by the corresponding pilot $s_k$.

At last, the invention encompasses a receiver for an OFDM communication system comprising:

a means for receiving a OFDM subframes comprising a set of pilots signals;

a means for performing an iterative loop for the purpose of computing $(M_k, k_k)$ respectively corresponding to the variance and the mean of the probability distribution of $p(h_k|y_k, I_k)$ at time instant k, $y_k$, and $I_k$ respectively corresponding to the received signal and to a priori known information; said value of $(M_k, k_k)$ being computed as a function of $(M_{k-1}, k_{k-1})$, $\lambda$ being the known time correlation between the true channel estimate $h_k$ and $h_{k-1}$, as well as the values of the pilots received at instant k.

DESCRIPTION OF THE DRAWINGS

Other features of one or more embodiments of the invention will best be understood by reference to the following detailed description when read in conjunction with the accompanying drawings.

DESCRIPTION OF THE PREFERRED EMBODIMENT

Figure 1:
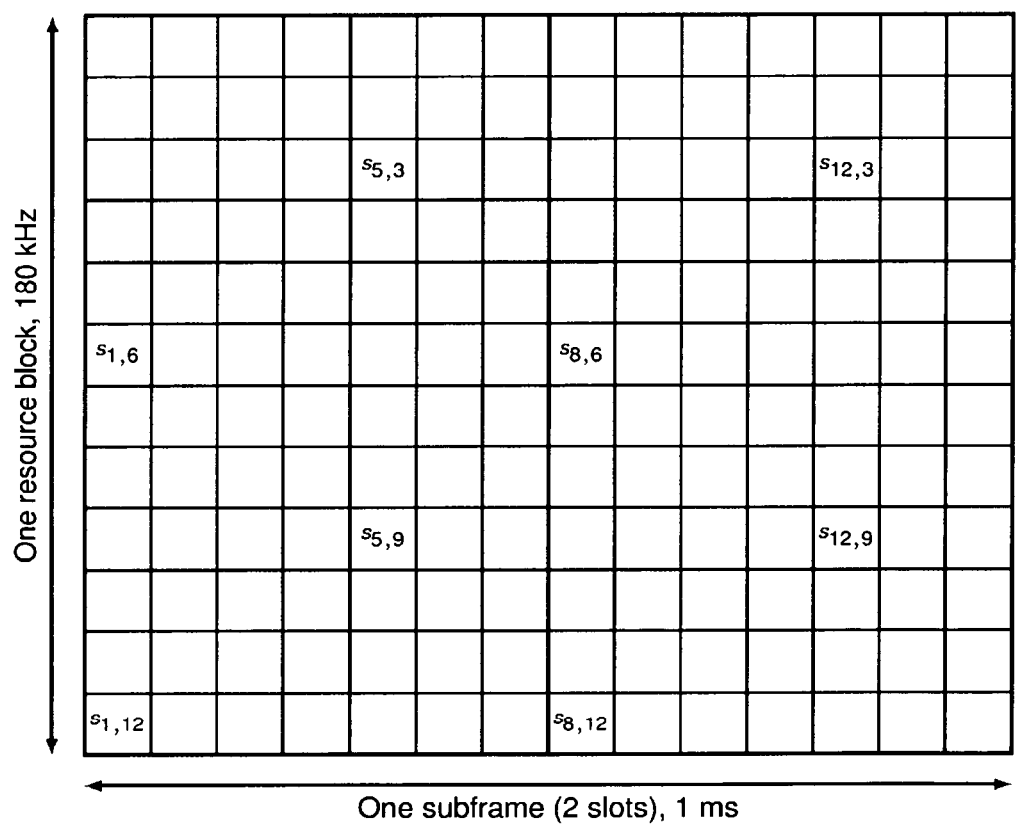
FIG. 1 illustrates a well known time-frequency grid of an OFDM subframe comprising pilot signals.

Some preliminary theoretical considerations (I) show to be appropriate before describing one embodiment of a channel estimation process (II)

I. Preliminary Theoretical Considerations

Channel estimation, along with most synchronization procedures, is an intricate information theoretic problem. Indeed, while Shannon (C. E. Shannon, "A mathematical theory of communications", Bell System Technical Journal, vol. 27, no. 7, pp. 379-423, 1948) allows us to derive the capacity of a channel for which all synchronization parameters, plus the noise variance, are perfectly known, no such theory exists when the knowledge of some of these parameters is missing.

More precisely, for a scalar communication y=hx+n, $x \in \chi$, for some codebook $\chi$, if h is unknown, then the maximum a posteriori estimate for x is $$\hat{x} = \underset{x \in X}{\operatorname{argmax}} \int_h \int_n p(x \mid h, n) p(h) p(n) dh dn \quad (1)$$

which requires to have an a priori p(h) for h. But this a priori is too impractical to obtain and would require to know all possible channel realizations and their respective probability. As a consequence to this strong difficulty, most contributions in the synchronization field have provided various empirical models based on field observations in order either to give an expression to p(h) or, more practically, to propose good channel estimators ĥ to h.

The difficulty of handling estimation problems when little side information is available is treated by Jaynes, through the Bayesian probability field, thanks to the maximum entropy principle (MaxEnt) (E. T. Jaynes, "Information Theory and Statistical Mechanics", Physical Review, APS, vol. 106, no. 4, pp. 620-630, 1957).

However MaxEnt does not allow to perform updates of probability when new information, such as new pilots in the channel estimation problem, is available. In this case, the complete set of past symbols along with a prior distribution for the channel $h_0$ at time t=0.

The inventors have discussed such question fro the OFDM framework in the article "*A maximum entropy approach to OFDM channel estimation*", arxiv Preprint http://arxiv.org/pdf/0811.0778 when the channel delay spread, the channel time correlation and the signal-to noise ratio (SNR) are alternatively known or unknown. When these parameters are not perfectly known, MaxEnt provides channel estimates minimizing the estimate mean square error (MMSE estimates) that outperform classical estimates which use empirical (often erroneous) models. Recent contributions in the Bayesian probability field enable one to perform probability updates, in particular based minimum cross entropy considerations [See A. Caticha, "Lectures on Probability, Entropy and Statistical Physics", arXiv:0808.0012v1 [physics.data-an], 2008].

1. OFDM System Model

Preliminary notations: in the following boldface lower case represent vectors, capital boldface characters denote matrices ($I_N$ is the N×N identity matrix). The transposition operation is denoted $(\cdot)^T$. The Hermitian transpose is denoted $(\cdot)^H$. The operator diag(x) turns the vector x into a diagonal matrix. The symbol det(X) is the determinant of matrix X. The symbol E[·] denotes expectation. The Kronecker delta function is denoted $\delta_x$ that equals 1 if x=0 and equals 0 otherwise.

Consider a single cell OFDM system with N subcarriers. The cyclic prefix (CP) length is $N_{CP}$ samples. In the time-frequency OFDM symbol grid, pilots are found in the symbol positions indexed by the function $\phi_t(n) \in \{0, 1\}$ which equals 1 if a pilot symbol is present at subcarrier n, at symbol time index t, and 0 otherwise. The time-frequency grid is depicted in FIG. 1. Both data and pilots at time t are modeled by the frequency-domain vector $S_t \in \mathbb{C}^N$ with pilot entries of amplitude $|s_{t,k}|^2=1$. The transmission channel is denoted $h_t \in \mathbb{C}^N$ in the frequency-domain with entries of variance $E[|h_{t,k}|^2]=1$. The additive noise is denoted $n_t \in \mathbb{C}^N$ with entries of variance $E[|n_{t,k}|^2]=\sigma^2$. The noise process is modeled as Gaussian with independent and identically distributed (i.i.d.) entries, $n \sim \mathcal{CN}(0, \sigma^2 I_N)$ The time-domain representation of $h_t$ is denoted $v_t \in \mathbb{C}^L$ with L the channel length, i.e. the channel delay spread expressed in OFDM-sample unit. The frequency-domain received signal $y_t \in \mathbb{C}^N$ is then:

$$y_t = \text{diag}(h_t) s_t + n_t \quad (2)$$

We will also denote, $$\forall k \in \{1, \ldots, N\}$$

$$h'_k = y_k/s_k = h_k + n_k/s_k$$

and $h' = (h'_1, \ldots, h'_N)^T$ (here, the time index t is implicit).

The channel $h_t$ evolves in time with coherence time function $\lambda(\tau)$ such that, independently of the channel delay spread index $$E[v_{i,t} v^*_{i,t+\tau}] = \frac{\lambda(\tau)}{L} \quad (3)$$

This model is justified by maximum entropy considerations (see e.g. the reference R. Couillet, M. Debbah, "*A maximum entropy approach to OFDM channel estimation*", arxiv Preprint http://arxiv.orq/pdf/0811.0778) and leads for $p(h_t|h_{t+\tau})$ to be assigned a Gaussian distribution of mean $\lambda(\tau) h_{t+\tau}$ and variance $$E[h_t h_{t+\tau}^H] = (1 - \lambda(\tau)^2) Q \quad (4)$$

With $$Q_{nm} = E\left[\sum_{k=0}^{L-1}\sum_{l=0}^{L-1} v_k v_l^* e^{-2\pi i \frac{kn-lm}{N}}\right] = \frac{1}{L}\sum_{k=0}^{L-1} e^{-2\pi i k \frac{n-m}{N}} \quad (5)$$

This work aims at providing MMSE estimates $\hat{h}_t \in \mathbb{C}^N$ of the vector ht when the receiver, at time t is only aware of:

(i) the last stream of pilots received at some time $t_p \leq t$, (ii) the last density function $p(h_{t0})$ assigned to $h_{t0}$. All other system parameters, e.g. channel delay spread, channel coherence time, SNR, are either known or unknown. This will be clearly stated in the following and will be denoted I.

2. ME Principle and Application to Channel Estimation.

The fundamental difference between orthodox and Bayesian probabilities lies in the existence of prior distributions in the Bayesian realm. In the present situation, when estimating $h_t$ from the observation $y_t$, orthodox probabilists decide for a maximum likelihood estimator $\hat{h}_t = \arg\max_{h_t} p(h_t|h'_t)$, following a given model linking $h'_t$ to $h_t$. Bayesian probabilists would note that $$p(h_t|h'_t, I) = p(h'_t|h_t, I) p(h_t|I)/p(h'_t|I).$$

$$p(h_t|h'_t, I) = p(h'_t|h_t, I) p(h_t|I)/p(h'_t|I),$$

where I is the side information of the estimator. The probability $p(h_t|I)$ is the subjective prior distribution for $h_t$, which is immaterial in orthodox probability.

To derive $p(h_t|I)$ based on prior statistical knowledge on $h_t$, e.g. first order moments, Jaynes introduces the maximum entropy principle in the reference E. T. Jaynes, "Information Theory and Statistical Mechanics", Physical Review, APS, vol. 106, no. 4, pp. 620-630, 1957.

The latter allows to assign a distribution to $p(h_t|I)$ which satisfies the statistical constraints given by I and which minimizes the risk of making unwanted assumptions, by maximizing the entropy of $p(h_t|I)$.

When it comes to update probability assignments, Caticha proposes an extension of the maximum entropy principle, namely the minimum cross entropy principle (ME) in A. Caticha, "Lectures on Probability, Entropy and Statistical Physics", arXiv:0808.0012v1 [physics.data-an], 2008.

When $p(h_t|I_1)$ has been assigned for some side information $I_1$, and new cogent information $I_2$ is later available, then the ME principle consists in assigning to $p(h_t|I_2)$ the distribution $$p(h_t | I_2) = \arg\min_q S[q, p(h_t | I_1)] \quad (6)$$

Where $$S[q, p] = \int q(x) \log\left(\frac{p(x)}{q(x)}\right) dx \quad (7)$$

It can therefore be derived a method based on a minimal update requirement, which in essence assigns to $p(h_t|I_2)$ the unique distribution which minimizes the changes brought to $p(h_t|I_1)$ while satisfying the new constraints given by $I_2$.

In the following, additional side information on $h_t$ (which possibly varies over time) will come from new available pilots at later time positions.

3. dynamic Optimal Channel Estimation for OFDM with Perfect System Parameter Knowledge Channel estimation is performed at different time instants $t_k, k \in \mathbb{N}$.

Denote $I_k$ the knowledge at time $t_k$. Since memory restrictions impose to discard past, we decide here only to consider at time $t_k$ the last received pilot data symbols, the last assigned probability $p(h_k|I_{k-1})$, $h_k = h_{tk}$ and the supposedly known time correlation $\lambda$ between time t and the past channel $h_{k-1}$. Assume prior assigned distribution $p(h_{k-1}|I_{k-1})$ at time index k–1. We have in general $$p(h_k | y_k, I_k) \quad (8)$$

$$= \frac{p(y_k | h_k, I_k) \cdot p(h_k | I_k)}{p(y_k | I_k)} \quad (9)$$

$$= \frac{p(y_k | h_k, I_k) \cdot \int p(h_k | h_{k-1}, I_k) \cdot p(h_{k-1} | I_k) dh_{k-1}}{p(y_k | I_k)} \quad (10)$$

Using Caticha's ME principle and set $p(h_{k-1}|I_k)$ to the previous $p(h_{k-1}|y_{k-1}, I_{k-1})$. The reason lies in the minimal update principle: if no additional information is given in $I_k$, compared to $I_{k-1}$, then $p(h_{k-1}|y_{k-1}, I_{k-1})$ is the distribution q that minimizes the cross-entropy $S[q, p(h_{k-1}|y_{k-1}, I_{k-1})]^2$ Let us now perform a recursive reasoning over the channel estimates at time indexes $k \in \mathbb{N}$. Assume that $p(h_{k-1}|y_{k-1}, I_{k-1})$ is Gaussianz, $\mathcal{CN}(k_{k-1}, M_{k-1})$.

One may show that this implies $p(h_k|y_k, I_k)$ is still Gaussian. This will therefore be denoted $\mathcal{C} \, \mathcal{N}(k_k, M_m^{-1})$ We have $$p(h_k \mid y_k, I_k) \quad (11)$$

$$= \alpha_1 p(y_k \mid h_k, I_k) \cdot \int p(h_k \mid h_{k-1}, I_k) \cdot p(h_{k-1}, I_k) dh_{k-1} \quad (12)$$

$$= \lim_{\tilde{Q} \to Q} e^{(h_k - h'_k)^H \frac{P_k}{\sigma^2}(h_k - h'_k)} \int e^{(h_k - \lambda h_{k-1})^H \frac{\tilde{Q}^{-1}}{1-\lambda^2}(h_k - \lambda h_{k-1})} \times \quad (13)$$

$$\alpha_2 e^{(h_{k-1} - k_{k-1})^H M_{k-1}^{-1}(h_{k-1} - k_{k-1})} dh_{k-1}$$

where the $\tilde{Q}$'s are taken from a set of invertible matrices in the neighborhood of $Q$, and the $\alpha_i$'s are constants.

First we need to write the exponents of the Gaussian products in the integrand in a single Gaussian exponent form of the vector $h_{k-1}$ times a constant independent of $h_{k-1}$. By expansion and simplification, this is $$(h_k - \lambda h_{k-1})^H \frac{\tilde{Q}^{-1}}{1-\lambda^2}(h_k - \lambda h_{k-1}) + (h_{k-1} - k_{k-1})^H M_{k-1}^{-1}(h_{k-1} - k_{k-1}) = (h_{k-1} - 1)^H N(h_{k-1} - 1) + C(h_k) \quad (14)$$

With $$\begin{cases} N = \frac{\lambda^2 \overline{Q}^{-1}}{1-\lambda^2} + M_{k-1}^{-1} \\ 1 = N^{-1}\left(\frac{\lambda}{1-\lambda^2}\tilde{Q}^{-1}h_k + M_{k-1}^{-1}k_{k-1}\right) \\ C = h_k^H \frac{\overline{Q}^{-1}}{1-\lambda^2}h_k + k_{k-1}^H M_{k-1}^{-1}k_{k-1} - \left(h_k + \frac{1-\lambda^2}{\lambda}\tilde{Q}M_{k-1}^{-1}\right)^H \frac{\lambda^2}{(1-\lambda^2)^2}\tilde{Q}^{-1}\left(\frac{\lambda^2 \overline{Q}^{-1}}{1-\lambda^2} + M_{k-1}^{-1}\right)^{-1}\tilde{Q}^{-1}\left(h_k + \frac{1-\lambda^2}{\lambda}\tilde{Q}M_{k-1}^{-1}k_{k-1}\right) \end{cases}$$

The integral (13) is then a constant times $e^C$, which depends on $h_k$. The term $C$ must then be written again into a quadratic expression of $h_k$. This is $$C = (h_k - j)^H R(h_k - j) + B \quad (15)$$

with $$\begin{cases} R = (\lambda^2 M_{k-1} + (1-\lambda^2)\tilde{Q})^{-1} \\ j = \lambda k_{k-1} \\ B = 0 \end{cases} \quad (16)$$

Together with the term outside the integral (13), this is $$p(h_k|y_k, I_k) = \alpha \cdot e^{(h_k - k_k)^H M_k^{-1}(h_k - k_k)} \quad (17)$$

With $\alpha = (\int p(h_k|y_k, I_k)dh_k)^{-1}$.

Finally, after some arithmetic derivation, in the limit $\tilde{Q} \to Q$, $$\begin{cases} M_k = \lambda^2 \left(M_{k-1} + \frac{1-\lambda^2}{\lambda^2}Q\right) \times \left(\frac{\lambda^2}{\sigma^2}P_k\left(M_{k-1} + \frac{1-\lambda^2}{\lambda^2}Q\right) + I_N\right)^{-1} \\ k_k = \lambda k_{k-1} + \frac{1}{\sigma^2}M_k P_k(h'_k - \lambda k_{k-1}) \end{cases} \quad (18)$$

And the MMSE estimator $\hat{h}_k$ for the channel at time index $k$ is the first order moment of a Gaussian distribution centered in $k_k$ which is $\hat{h}_k = k_k$. At initial time instant $t_0$, if nothing but the channel delay spread $L$ is known, $M_0 = Q$ from MaxEnt, and $k_0 = 0$. Therefore, we prove by the above recursion that, under this state of initial knowledge, for all $k \in \mathbb{N}$ $p(h_k|I_k)$ is Gaussian with mean $k_k$ and variance $M_k$, and $\hat{h}_k = k_k$. Note that, while regularized inverses of $Q$ were used along the derivations, the final formulas are properly conditioned with respect to $Q$.

The process which will be described hereafter will take advantage of this particular observation, and will achieve an iterative mechanism of channel estimation, based on an iterative update of both the mean $k_k$ and variance $M_k$ of the distribution of the channel estimation.

Before entering into the particular detail of the process, the inventors have further discovered that the channel estimation can even be achieved without perfect system parameter knowledge 4. Dynamic Optimal Channel Estimation for OFDM with Perfect System Parameter Knowledge In practical applications, contrary to what was stated above, the different parameters $\lambda$, $\sigma^2$ and $L$ especially, might not be perfectly known. For simplicity we assume those parameters are constant over the duration of the channel estimation process. Following the MaxEnt principle, these parameters must be assigned an a priori distribution. Let us focus on the time correlation $\lambda$, which is typically the most difficult parameter to track. In this respect, one has $$p(h_k|y_k, I_k) = \int p(h_k|y_k, \lambda I_k)p(\lambda|y_k, I_k)d\lambda \quad (19)$$

Since $y_k$ cannot bring alone any cogent information on $\lambda$, $p(\lambda|y_k, I_k) = p(\lambda|I_k)$. The probability $p(h_k|y_k, \lambda, I_k)$ was computed above and is given by the right-hand side of Equation (17), in which $\alpha$ depends on $\lambda$ and must therefore be made explicit.

Further computation leads to $$p(h_k|y_k, I_k) = \int p(\lambda|I_k)\alpha(\lambda)e^{(h_k - k_k^{(\lambda)})^H (M_k^{(\lambda)})^{-1}(h_k - k_k^{(\lambda)})}d\lambda \quad (20)$$

with $M_k^{(\lambda)}$ and $k_k^{(\lambda)}$ given by Equation (18) above for the $\lambda$ in question and $$\alpha(\lambda) = \beta e^{-x(\lambda)} \det[X(\lambda)] \quad (21)$$

With $$\begin{cases} X(\lambda) = \left(I + \frac{P_k}{\sigma^2}(\lambda^2 M_{k-1}^{(\lambda)} + (1-\lambda^2)Q)\right)^{-1} \\ x(\lambda) = (\lambda k_{k-1}^{(\lambda)} - h'_k)^H X(\lambda) \frac{P_k}{\sigma^2}(\lambda k_{k-1}^{(\lambda)} - h'_k) \end{cases} \quad (22)$$

And $$\beta = \left(\int p(h_k \mid y_k, I_k)dh_k\right)^{-1}, \text{ independent of } \lambda.$$

The MMSE estimate $\hat{h}_k$ is then the weighted sum:

$$\hat{h}_k = \frac{\int p(\lambda \mid I_k) e^{-x(\lambda)} \det[X(\lambda)] k_k^{(\lambda)} d\lambda}{\int p(\lambda \mid I_k) e^{-x(\lambda)} \det[X(\lambda)] d\lambda} \quad (23)$$

This integral is however very involved. In practice, it must be broken into a finite sum over a set of potential values for $\lambda$. Denoting S this set and $|S|$ its cardinality, the recursive algorithm that provides the successive estimates $\hat{h}n_k$ k=1, ..., K, requires that at every step, the values for $M_k^{(\lambda)}$ and $k_k^{(\lambda)}$, $\lambda \in S$ are kept in memory.

One may then describe the preferred embodiment of a channel estimation process which is based on the underlying above described principle.

II. Preferred Embodiment of the Channel Estimation Process for a OFDM Communication System It has been demonstrated how the knowledge of the variance and estimate $M_k^{(\lambda)}$ and $k_k^{(\lambda)}$ at k−1 can be advantageously used for achieving an iterative estimation method based on the update mechanism shown in formulas (18). With the hypothesis of a Gaussian channel, the information collected by the estimate at instant k−1 and the variance shows to be minimal and, therefore, allows to reduce the quantity of data to be stored within the memory since the variance will only need to be represented by an N×N matrix.

Furthermore, while the processes described below will be discussed in the frequency domain, where a matrix shows to be an N×N matrix which might have a significant size, the computations below may also be performed in the time domain what will result in a significant reduction of the size of the matrix.

Figure 2:
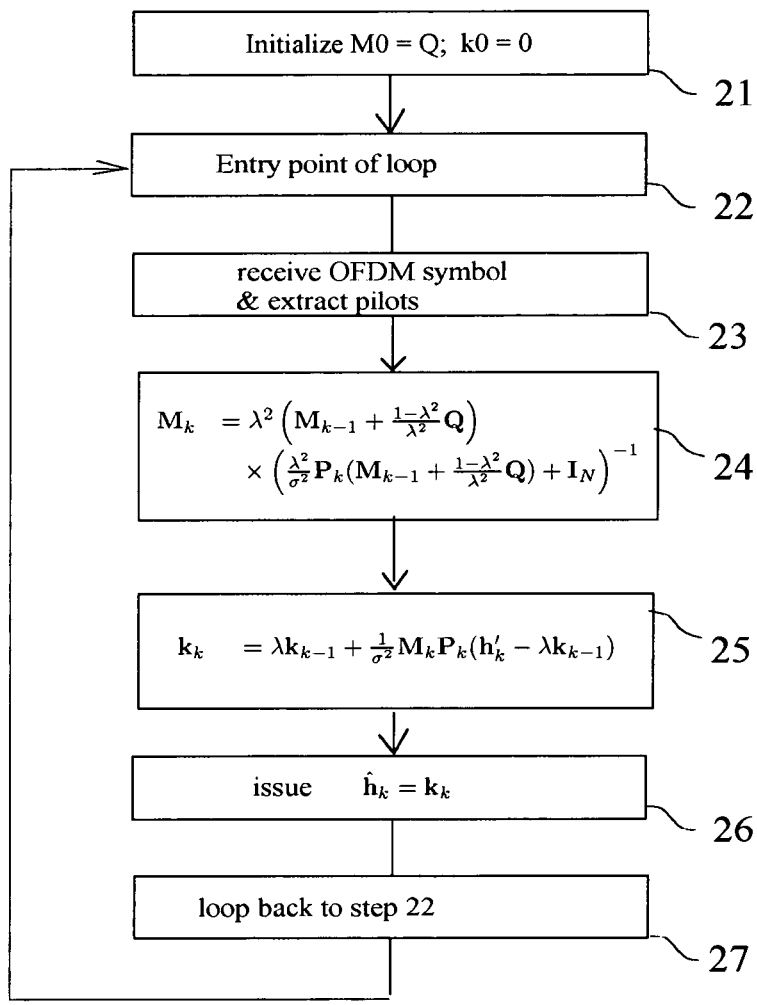
FIG. 2 illustrates a first embodiment of a process of channel estimation in accordance with the present invention.

With respect to FIG. 2, there is now described one embodiment of a process which assumes the knowledge of the value of $\lambda$ In a step 21, the process starts with an initialization step. At time t=0, the values of $M_0$ and $k_0$ are respectively set to Q and 0.

Then, in a step 22, the process enters into a loop;

Then, in a step 23, the process receives an OFDM symbol and may extract the received signal and the pilots therein contained.

Then, in a step 24, the process computes an estimate value of the variance of the probability distribution of $p(h_k|y_k, I_k)$ at time instant k, $y_k$, and $I_k$ respectively corresponding to the received signal and to a priori known information, in accordance with the following formula:

$$M_k = \lambda^2 \left(M_{k-1} + \frac{1-\lambda^2}{\lambda^2} Q\right) \times \left(\frac{\lambda^2}{\sigma^2} P_k \left(M_{k-1} + \frac{1-\lambda^2}{\lambda^2} Q\right) + I_N\right)^{-1}$$

With
N being the number of sub carriers in the OFDM symbol;
$k_k$ being the estimated channel at instant k;
$M_k$ being a N×N matrix representative of the variance of the estimated channel at instant k;
Q being a matrix initialized to a predetermined value;
$P_k$ is an N×N diagonal matrix comprising a "1" at the location of a pilot symbol and a "0" elsewhere;
$I_N$ being the N×N identity matrix;
$\lambda$ corresponding to the known channel time correlation between instant k−1 and k.

Then, in a step 25 the process computes an estimate value of the channel $k_k$ in accordance with the formula:

$$k_k = \lambda k_{k-1} + \frac{1}{\sigma^2} M_k P_k (h'_k - \lambda k_{k-1})$$

With
$\sigma^2$ being the variance of the noise;
$h'_k$ being equal to the received signal $y_k$ pointwise divided by the corresponding pilot $s_k$;

Then, in a step 26, the process issues the estimate value $\hat{h}_k = k_k$

Then, in a step 27, the process loops back to step 22 in order to process the next OFDM symbol.

Figure 3:
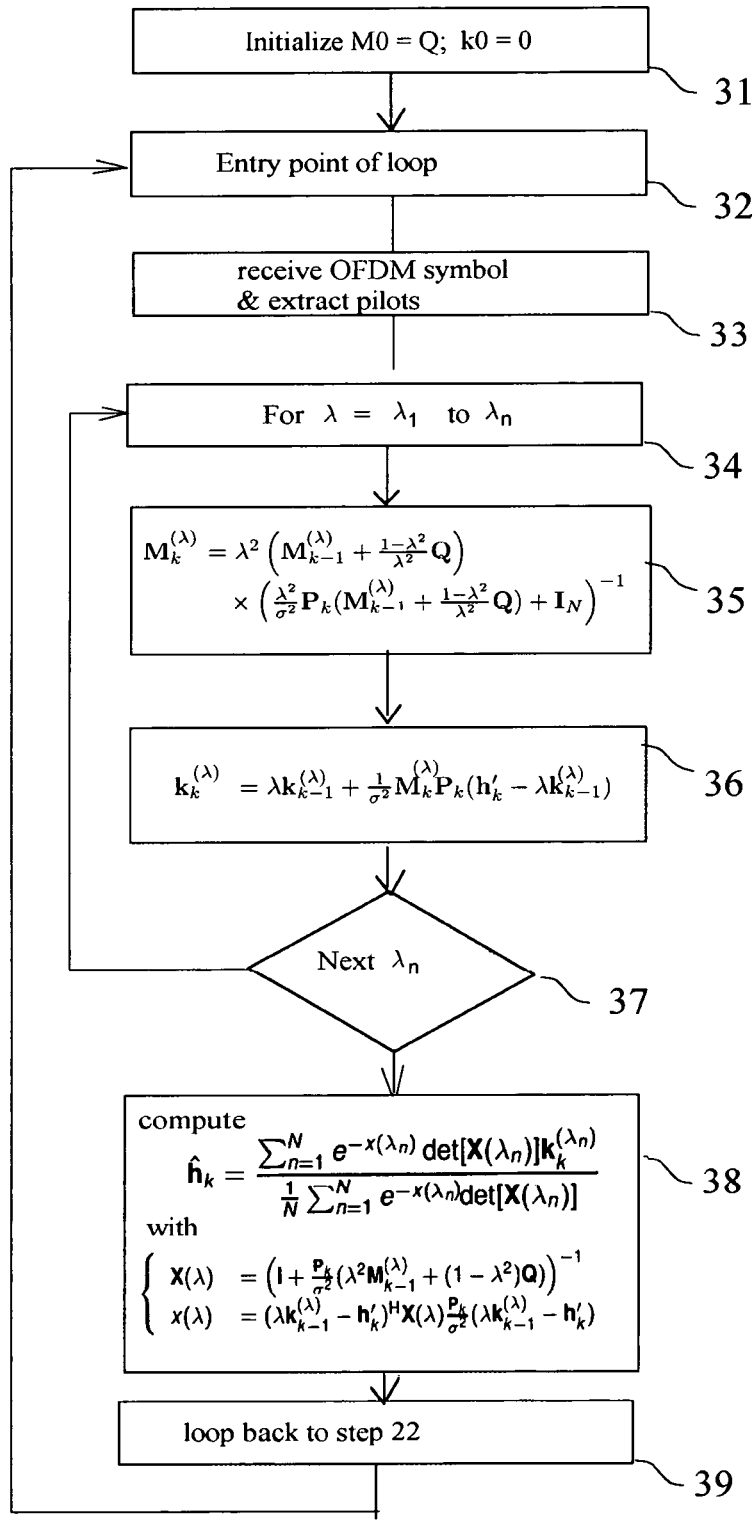
FIG. 3 illustrates a second embodiment which does not require the knowledge of the channel time correlation factor.
Figure 4:
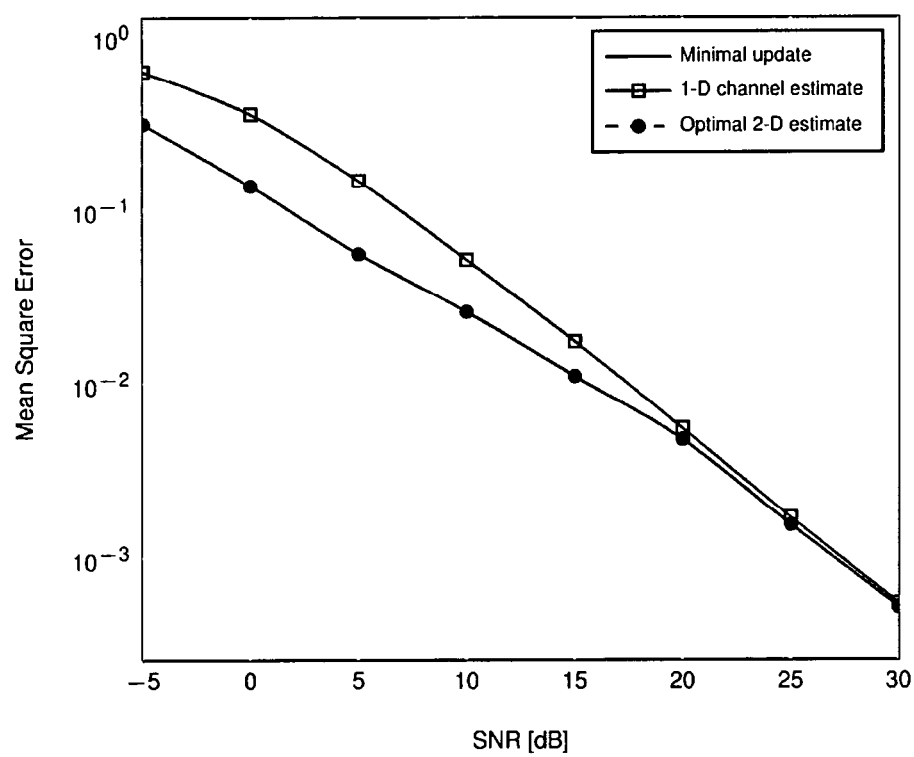
FIGS. 4 and 5 illustrate simulation of the results obtained with the process.

With respect to FIG. 3, there is illustrated a second embodiment of a process of channel estimation which takes no assumption on the value of $\lambda$.

In a step 31, the process starts with an initialization step similar to step 21 above.

In a step 32 the process enters a loop.

In a step 33, the process receives an OFDM sample.

Then, in step 34, the process enters a new loop for processing a predetermined set of possible coefficients number of values $(\lambda_1 \lambda_2 \lambda_3 \ldots \lambda_n \ldots \lambda_M)$ with n=1 to M. To each value $\lambda_n$ one associates a couple $(M_k^{(\lambda)}, k_k^{(\lambda)})$, which will be calculated in accordance with the same formula as above.

Indeed, in steps 35 and 36 the process successively computes $M_k^{(\lambda)}$ and $k_k^{(\lambda)}$ in accordance with the formulas:

$$\begin{cases} M_k^{(\lambda)} = \lambda^2 \left(M_{k-1}^{(\lambda)} + \frac{1-\lambda^2}{\lambda^2} Q\right) \times \left(\frac{\lambda^2}{\sigma^2} P_k \left(M_{k-1}^{(\lambda)} + \frac{1-\lambda^2}{\lambda^2} Q\right) + I_N\right)^{-1} \\ k_k^{(\lambda)} = \lambda k_{k-1}^{(\lambda)} + \frac{1}{\sigma^2} M_k^{(\lambda)} P_k (h'_k - \lambda k_{k-1}^{(\lambda)}) \end{cases}$$

With
N being the number of sub carriers in the OFDM symbol;
$k_k$ being the estimated channel at instant k;
$M_k$ being a N×N matrix representative of the variance of the estimated channel at instant k;
Q being a matrix initialized to a predetermined value;
$P_k$ is an N×N diagonal matrix comprising a "1" at the location of a pilot symbol and a "0" elsewhere;
$I_N$ being the N×N identity matrix;
$\lambda$ corresponding to the known channel time correlation between instant k−1 and k.

Then, in a step 37, a test is considered in order to determine whether a subsequent value $\lambda_{n+1}$ is to be processed.

If so, the process returns to step 34 above for the purpose of computing that new value and, conversely, if all the values of $(\lambda_1 \lambda_2 \lambda_3 \ldots \lambda_n \ldots \lambda_M)$ have been processed, then the process proceeds to step 38 where it computes the estimate $\hat{h}_k$ of the channel from a weighted sum of the latter, as follows:

$$\hat{h}_k = \frac{\sum_{n=1}^{N} e^{-x(\lambda_n)} \det[X(\lambda_n)] k_k^{(\lambda_n)}}{\frac{1}{N} \sum_{n=1}^{N} e^{-x(\lambda_n)} \det[X(\lambda_n)]}$$

With

-continued $$\begin{cases} X(\lambda) = \left(I + \frac{P_k}{\sigma^2}(\lambda^2 M_{k-1}^{(\lambda)} + (1-\lambda^2)Q)\right)^{-1} \\ x(\lambda) = (\lambda k_{k-1}^{(\lambda)} - h'_k)^H X(\lambda) \frac{P_k}{\sigma^2}(\lambda k_{k-1}^{(\lambda)} - h'_k) \end{cases}$$

With $k_k^{(\lambda)}$ being the estimated channel at instant k depending on $\lambda$, $M_k^{(\lambda)}$ being a matrix representative of the variance of the estimated channel at instant k assuming $\lambda$ time correlation.

The process then proceeds to step 39 which loops back to step 32 for the purpose of processing a new OFDM symbol.

Simulations and Results

In this section, we provide simulation plots to compare, at time t, the minimal channel estimation update method against (i) the one-dimensional MMSE, taken at time t, which takes only into account the last past pilot symbols and uses a fixed empirical covariance matrix, (ii) an typical optimum two-dimensional MMSE, with K=4 pilot time indexes. The OFDM DFT size is N=64, the channel length L=6 is known to the receiver, the vehicular speed is v=120 km/h, pilot sequences are transmitted every 0.29 ms (as in 3GPPLTE [7]), and the induced Jake's time correlation $\lambda$ between t and the past pilot sequence arrival time is known to the receiver. In scenario (ii), all K past received pilot sequences and time correlations are perfectly known. The channel time correlation model is a K-order autoregressive model following the reference K. E. Baddour and, N. C. Beaulieu, "Autoregressive modeling for fading channel simulation," IEEE Transaction on Wireless Communications, July 2005.

Figure 5:
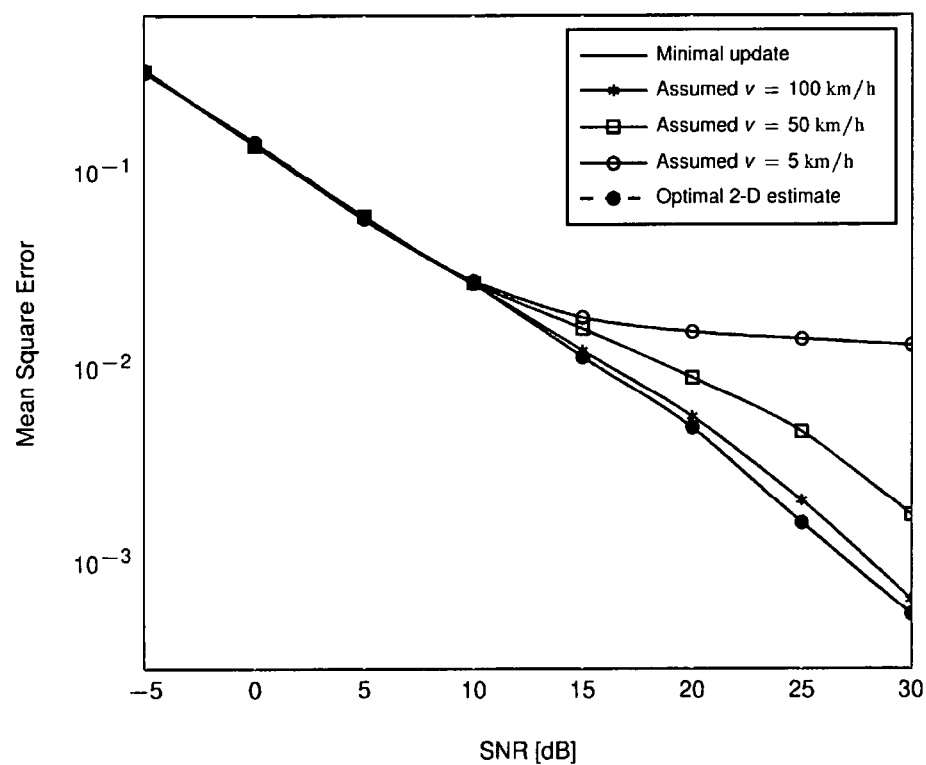

A performance comparison is proposed in FIG. 5. We notice here that the minimal update algorithm does not show significant performance decay compared to the optimal two-dimensional MMSE estimator, while the one-dimensional MMSE estimator, also relying on the last past pilot sequence, shows large performance impairment.

In FIG. 3, with the same assumptions as previously, we consider the hypothesis where the vehicular speed v is a priori known to be (with equal probabilities) either 5, 50, 120 km/h. The performance is compared against the optimal 2-D algorithm where v is known but erroneously estimated (v=5, 50, 100 km/h). It is observed that, again, even when $\lambda$, or equivalently v, is a priori unknown, the Bayesian minimal update framework manages to ideally recover the channel with no performance decay. On the opposite, when $\lambda$ is erroneously estimated, the performance decay of the optimal estimator might be dramatic.

The invention claimed is:

1. A process for estimating a channel in an OFDM communication system, wherein an OFDM sample is based on a time-frequency grid comprising a set of pilots, the process comprising the steps of:
   receiving, by a receiver, OFDM sample based subframes comprising a set of pilot signals;
   performing an iterative loop for the purpose of computing ($M_k$, $k_k$) respectively corresponding to the covariance matrix and the mean of the probability distribution of $p(h_k|y_k, l_k)$ at time instant k, $y_k$, and $l_k$ respectively corresponding to the received signal and to a priori known information and $h_k$ being a true channel at time instant k; and
   said value of ($M_k$, $k_k$) being computed as a function of ($M_{k-1}$, $k_{k-1}$) as well as the values of the pilots received at instant k.

2. The process for estimating the channel in an OFDM communication system according to claim 1 further comprising the steps of:
   receiving OFDM sample based subframes comprising a set of pilots signals;
   performing an estimation of the channel based on the mean $k_k$ and variance $M_k$ of the distribution of the true channel $h_k$ in accordance with the following formulation:

$$\begin{cases} M_k = \lambda^2\left(M_{k-1} + \frac{1-\lambda^3}{\lambda^2}Q\right) \times \left(\frac{\lambda^2}{\sigma^2}P_k\left(M_{k-1} + \frac{1-\lambda^2}{\lambda^2}Q\right) + I_N\right)^{-1} \\ k_k = \lambda k_{k-1} + \frac{1}{\sigma^2}M_k P_k(h'_k - \lambda k_{k-1}) \end{cases}$$

with

N being the number of sub carriers in the OFDM symbol;

$k_k$ being the mean of the inferred probability distribution $p(h_k|y_k, l_k)$ at time instant k;

$M_k$ being a N×N matrix representative of the variance of the probability distribution of $p(h_k|y_k, l_k)$ at time instant k;

Q being a matrix initialized to a predetermined value;

$P_k$ is an N×N diagonal matrix comprising a "1" at the location of a pilot symbol and a "0" elsewhere;

$I_N$ being the N×N identity matrix;

$\lambda$ corresponding to the known channel time correlation between instant k−1 and k;

$\sigma^2$ being the variance of the noise; and $h'_k$ being equal to the received signal $y_k$ pointwise divided by the corresponding pilot $s_k$.

3. The process according to claim 2 wherein Q is an a priori frequency covariance matrix for an L-tap uniform channel.

4. The process according to claim 2 wherein the time correlation factor ($\lambda$) corresponds to the correlation factor in the auto regressive model of the first order of $h_k$.

5. The process according to claim 1 wherein said parameter $M_k$ is forwarded to the base station as an information representative of the quality of the channel estimation.

6. The process according to claim 1 adapted to the 3GPP Long Term Evolution (LTE) standard.

7. A process for estimating a channel in an OFDM communication system, wherein an OFDM sample is based on a time-frequency grid comprising a set of pilots, the process comprising the steps of:
   receiving, by a receiver, OFDM sample based subframes comprising a set of pilots signals;
   performing an iterative loop for the purpose of computing ($M_k^{(\lambda)}$, $k_k^{(\lambda)}$) respectively corresponding to the variance and the mean of the probability distribution of $p(h_k|y_k, l_k)$ at time instant k, $y_k$, and $l_k$ respectively corresponding to the received signal and to a priori known information;
   said value of ($M_k^{(\lambda)}$, $k_k^{(\lambda)}$) being computed as a function of ($M_{k-1}^{(\lambda)}$, $k_{k-1}^{(\lambda)}$) for $\lambda$ spanning a predetermined set of values $\{\lambda_n\}$ with n=1 to M between true channel $h_k$ and $h_{k-1}$ respectively at time instant k and k−1, as well as the values of the pilots received at instant k, $$\hat{h}_k = \frac{\sum_{n=1}^{N} e^{-x(\lambda_n)} \det[X(\lambda_n)] k_k^{(\lambda_n)}}{\frac{1}{N} \sum_{n=1}^{N} e^{-x(\lambda_n)} \det[X(\lambda_n)]}$$

With $$\begin{cases} M_k^{(\lambda)} = \lambda^2 \left( M_{k-1}^{(\lambda)} + \frac{1-\lambda^2}{\lambda^2} Q \right) \times \left( \frac{\lambda^2}{\sigma^2} P_k \left( M_{k-1}^{(\lambda)} + \frac{1-\lambda^2}{\lambda^2} Q \right) + I_N \right)^{-1} \\ k_k^{(\lambda)} = \lambda k_{k-1}^{(\lambda)} + \frac{1}{\sigma^2} M_k^{(\lambda)} P_k (h'_k - \lambda k_{k-1}^{(\lambda)}) \end{cases}$$

And $$\begin{cases} X(\lambda) = \left( I + \frac{P_k}{\sigma^2} (\lambda^2 M_{k-1}^{(\lambda)} + (1-\lambda^2)Q) \right)^{-1} \\ x(\lambda) = (\lambda k_{k-1}^{(\lambda)} - h'_k)^H X(\lambda) \frac{P_k}{\sigma^2} (\lambda k_{k-1}^{(\lambda)} - h'_k) \end{cases}$$

with $k_k^{(\lambda)}$ being the mean of the probability distribution of $p(h_k|y_k, 1_k)$ at instant k depending on $\lambda$, . . .

$M_k^{(\lambda)}$ being a matrix representative of the variance of the estimated channel at instant k; depending on $\lambda$, Q being a matrix initialized to a predetermined value;

$P_k$ is a diagonal N×N matrix comprising a "1" at the location of a pilot symbol;

$I_N$ being the N×N identity matrix;

$\sigma^2$ being the variance of the noise;

$h'_k$ being equal to the received signal $y_k$ pointwise divided by the corresponding pilot $s_k$;

$\lambda$ corresponding to the known channel time correlation between instant k−1 and k;

H is the Hermitian transpose; and det[X] is the determinant of the matrix X.

8. The process according to claim 7 wherein Q is an a priori frequency correlation matrix for an L-tap uniform channel.

9. The process according to claim 7 wherein the set of time correlation factors $\{\lambda_n\}$ corresponds to hypothetical values for the time correlation parameter $\lambda$.

10. The process according to claim 7 wherein said parameter $M_k$ is forwarded to the base station as an information representative of the quality of the channel estimation.

11. The process according to claim 7 wherein it is adapted to the Long Term Evolution (LTE) standard.

12. A receiver for an OFDM communication system comprising:

a means for receiving a OFDM sample based subframes comprising a set of pilots signals;

a means for performing an iterative loop for the purpose of computing ($M_k$, $k_k$) respectively corresponding to the variance and the mean of the probability distribution of $p(h_k|y_k, 1_k)$ at time instant k, $y_k$, and $1_k$ respectively corresponding to the received signal and to a priori known information; and said value of ($M_k$, $k_k$) being computed as a function of ($M_{k-1}$, $k_{k-1}$) as well as the values of the pilots received at instant k, with $h_k$ corresponding to the channel at the kth sampled time instant.

13. A receiver according to claim 12, said receiver being incorporated to a mobile communication device for an LTE communication system.

14. The receiver according to claim 12, further comprising:

a means for performing an estimation of the channel based on the mean $k_k$ and variance $M_k$ of the distribution of the channel estimation in accordance with the following formulation:

$$\begin{cases} M_k = \lambda^2 \left( M_{k-1} + \frac{1-\lambda^2}{\lambda^2} Q \right) \times \left( \frac{\lambda^2}{\sigma^2} P_k \left( M_{k-1} + \frac{1-\lambda^2}{\lambda^2} Q \right) + I_N \right)^{-1} \\ k_k = \lambda k_{k-1} + \frac{1}{\sigma^2} M_k P_k (h'_k - \lambda k_{k-1}) \end{cases}$$

with

N being the number of sub carriers in the OFDM symbol;

$k_k$ being the mean of the probability distribution of $p(h_k|y_k, 1_k)$ at time instant k;

$M_k$ being a N×N matrix representative of the variance of the probability distribution of $p(h_k|y_k, 1_k)$ at instant k;

Q being a matrix initialized to a predetermined value;

$P_k$ is an N×N diagonal matrix comprising a "1" at the location of a pilot symbol and a "0"elsewhere;

$I_N$ being the N×N identity matrix; and $\lambda$ corresponding to the known channel time correlation between instant k−1 and k;

$\sigma^2$ being the variance of the noise; and $h'_k$ being equal to the received signal $y_k$ pointwise divided by the corresponding pilot $s_k$.

15. A receiver for an OFDM communication system comprising a means for estimating the channel and characterized in that it further comprises:

a means for receiving a OFDM sample based subframes comprising a set of pilots signals;

a means for performing an iterative loop for the purpose of computing ($M_k^{(\lambda)}$, $k_k^{(\lambda)}$) respectively corresponding to the variance and the mean of the probability distribution of $p(h_k|y_k, 1_k)$ at time instant k, $y_k$, and $1_k$ respectively corresponding to the received signal and to a priori known information;

said value of ($M_k^{(\lambda)}$, $k_k^{(\lambda)}$) being computed as a function of ($M_{k-1}$, $k_{k-1}$) for a predetermined set of values of time correlation ($\lambda_n$) with n=1 to M between the true channels $h_k$ and $h_{k-1}$, with $h_k$ corresponding to the channel at the kth sampled time instant,as well as the values of the pilots received at instant k, $$\hat{h}_k = \frac{\sum_{n=1}^{N} e^{-x(\lambda_n)} \det[X(\lambda_n)] k_k^{(\lambda_n)}}{\frac{1}{N} \sum_{n=1}^{N} e^{-x(\lambda_n)} \det[X(\lambda_n)]}$$

with $$\begin{cases} M_k^{(\lambda)} = \lambda^2 \left( M_{k-1}^{(\lambda)} + \frac{1-\lambda^2}{\lambda^2} Q \right) \times \left( \frac{\lambda^2}{\sigma^2} P_k \left( M_{k-1}^{(\lambda)} + \frac{1-\lambda^2}{\lambda^2} Q \right) + I_N \right)^{-1} \\ k_k^{(\lambda)} = \lambda k_{k-1}^{(\lambda)} + \frac{1}{\sigma^2} M_k^{(\lambda)} P_k (h'_k - \lambda k_{k-1}^{(\lambda)}) \end{cases}$$

and $$\begin{cases} X(\lambda) = \left( I + \frac{P_k}{\sigma^2} (\lambda^2 M_{k-1}^{(\lambda)} + (1-\lambda^2)Q) \right)^{-1} \\ x(\lambda) = (\lambda k_{k-1}^{(\lambda)} - h'_k)^H X(\lambda) \frac{P_k}{\sigma^2} (\lambda k_{k-1}^{(\lambda)} - h'_k) \end{cases}$$

With $k_k^{(\lambda)}$ being the mean of the probability distribution of $p(h_k|y_k, 1_k)$ at instant k depending on $\lambda$, $M_k^{(\lambda)}$ being a matrix representative of the variance of the estimated channel at instant k; depending on $\lambda$, Q being a matrix initialized to a predetermined value;

$P_k$ is a diagonal N×N matrix comprising a "1" at the location of a pilot symbol;

$I_N$ being the N×N identity matrix;
$\sigma^2$ being the variance of the noise; and
$h'_k$ being equal to the received signal $y_k$ pointwise divided by the corresponding pilot $s_k$;
$\lambda$ corresponding to the known channel time correlation between instant k−1 and k;
H is the Hermitian transpose; and
det[X] is the determinant of the matrix X.

* * * * *